(12) United States Patent  
Sakaguchi

(10) Patent No.: US 10,100,815 B2  
(45) Date of Patent: Oct. 16, 2018

(54) CONDITION MONITORING APPARATUS FOR WIND TURBINE

(71) Applicant: NTN CORPORATION, Osaka (JP)

(72) Inventor: Tomoya Sakaguchi, Kuwana (JP)

(73) Assignee: NTN CORPORATION, Osaka (JP)

( * ) Notice: Subject to any disclaimer, the term of this patent is extended or adjusted under 35 U.S.C. 154(b) by 408 days.

(21) Appl. No.: 14/916,513

(22) PCT Filed: Sep. 3, 2014

(86) PCT No.: PCT/JP2014/073130  
§ 371 (c)(1),  
(2) Date: Mar. 3, 2016

(87) PCT Pub. No.: WO2015/033946  
PCT Pub. Date: Mar. 12, 2015

(65) Prior Publication Data

US 2016/0215764 A1    Jul. 28, 2016

(30) Foreign Application Priority Data

Sep. 4, 2013  (JP) ................................. 2013-183111  
Sep. 2, 2014  (JP) ................................. 2014-178173

(51) Int. Cl.  
 *F03D 17/00*  (2016.01)  
 *G01M 7/00*  (2006.01)  
 (Continued)

(52) U.S. Cl.  
 CPC .............. *F03D 17/00* (2016.05); *F03D 1/06* (2013.01); *F03D 80/82* (2016.05);  
 (Continued)

(58) Field of Classification Search  
 CPC ............ F03D 17/00; F03D 80/82; F03D 1/06; G01M 5/0033; G01M 5/0066; G01M 7/00;  
 (Continued)

(56) References Cited

U.S. PATENT DOCUMENTS

2004/0108729 A1  6/2004  Wobben  
2012/0139740 A1*  6/2012  Drossel .................. F03D 17/00  
                                                        340/658  
2013/0214534 A1  8/2013  Nakamura et al.

FOREIGN PATENT DOCUMENTS

CN         1505735 A    6/2004  
CN       102980651 A    3/2013  
 (Continued)

OTHER PUBLICATIONS

Office Action issued in corresponding Chinese Patent Application No. 201480048685.5, dated Feb. 2, 2018.  
International Search Report received in International Application No. PCT/JP2014/073130, dated Dec. 2, 2014.  
Extended European Search Report issued in corresponding EP Patent Application No. 14842258.7, dated Apr. 12, 2017.

*Primary Examiner* — Richard Edgar  
(74) *Attorney, Agent, or Firm* — McDermott, Will & Emery LLP

(57) ABSTRACT

Frequency analysis units are configured to perform a frequency analysis of vibrations detected by vibration sensors, respectively. A natural frequency detection unit is configured to detect a natural frequency of a wind turbine in accordance with a direction of a nacelle, based on results of the frequency analysis. A change ratio calculation unit calculates a decrease ratio in the natural frequency detected by the natural frequency detection unit. An abnormality detection unit determines that an abnormality is present in the wind turbine if the decrease ratio in the natural frequency calculated by the change ratio calculation unit exceeds a threshold value.

9 Claims, 7 Drawing Sheets

(51) Int. Cl.
*G01M 5/00* (2006.01)
*F03D 80/80* (2016.01)
*F03D 1/06* (2006.01)

(52) U.S. Cl.
CPC ........ *G01M 5/0033* (2013.01); *G01M 5/0066* (2013.01); *G01M 7/00* (2013.01); *F05B 2260/80* (2013.01); *F05B 2270/329* (2013.01); *F05B 2270/334* (2013.01); *Y02E 10/721* (2013.01); *Y02E 10/723* (2013.01); *Y02E 10/726* (2013.01)

(58) Field of Classification Search
CPC ............ F05B 2260/80; F05B 2270/329; F05B 2270/334; Y02E 10/721; Y02E 10/723; Y02E 10/726
See application file for complete search history.

(56) References Cited

FOREIGN PATENT DOCUMENTS

| | | | |
|---|---|---|---|
| EP | 2003335 | A2 | 12/2008 |
| EP | 2551519 | A1 | 1/2013 |
| JP | 2004-530825 | A | 10/2004 |
| JP | 2005-164314 | A | 6/2005 |
| JP | 2011-185632 | A | 9/2011 |
| JP | 2011-190762 | A | 9/2011 |
| JP | 2013-170507 | A | 9/2013 |

\* cited by examiner

| | DIRECTION OF NACELLE | | | |
|---|---|---|---|---|
| | 0–30° | 30–60° | ... | 330–360° |
| NATURAL FREQUENCY | f1(1) | f2(1) | ... | f12(1) |
| | f1(2) | f2(2) | ... | f12(2) |
| | f1(3) | f2(3) | ... | f12(3) |
| | f1(4) | f2(4) | ... | f12(4) |
| | f1(5) | f2(5) | ... | f12(5) |
| | f1(6) | f2(6) | ... | f12(6) |

| | RATING OF POWER GENERATOR | | |
|---|---|---|---|
| | 0–40% | 40–80% | 80% OR MORE |
| f1(1) | f1(1)-1 | f1(1)-2 | f1(1)-3 |

CONDITION MONITORING APPARATUS FOR WIND TURBINE

CROSS REFERENCE

This application is the U.S. National Phase under 35 US.C. § 371 of International Application No. PCT/JP2014/073130, filed on Sep. 3, 2014, which claims the benefit of Japanese Application No. 2013-183111, filed on Sep. 4, 2013 and Japanese Application No. 2014-178173, filed on Sep. 2, 2014, the entire contents of each are hereby incorporated by reference.

TECHNICAL FIELD

This invention relates to a condition monitoring apparatus for a wind turbine, and particularly to a condition monitoring apparatus for a wind turbine having a nacelle rotatably supported on a support.

BACKGROUND ART

Wind turbines are attracting attention as environmentally-friendly power generation equipment. In a wind turbine, blades and a nacelle are installed at a high altitude (for example, several tens of meters from the ground) on a support, wherein the blades convert a wind force into a rotational force, and the nacelle houses converters (a gearbox and a power generator) for converting the rotational force into electric power. The nacelle is rotatably supported on the support, and is configured to rotate in accordance with a wind direction.

In such a wind turbine, various types of condition monitoring is performed. For example, an abnormality predicting apparatus using an acceleration sensor, which is applicable to condition monitoring of, for example, a bearing for a main shaft that transmits the rotational force from the blades, or a bearing provided in the gearbox, is known (see, for example, PTD 1).

Moreover, Japanese Patent Laying-Open No. 2011-185632 (PTD 2) discloses an abnormality detecting apparatus that accurately detects an abnormality in a bearing provided in the blades of a wind turbine, based on a change in a natural frequency obtained through analysis of the frequency of a vibration signal detected using a vibration sensor (see PTD 2).

On the other hand, for condition monitoring of a non-rotary part (typically a support (tower)) of a wind turbine, abnormality detection is currently performed through regular visual checks or hammering checks.

CITATION LIST

Patent Document

PTD 1: Japanese Patent Laying-Open No. 2005-164314
PTD 2: Japanese Patent Laying-Open No. 2011-185632

SUMMARY OF INVENTION

Technical Problem

In a wind turbine, it is desired that condition monitoring be automatically performed not only for rotary members such as the bearings, the gearbox, and the like, but also for the non-rotary part, which is typically the support. Specifically, automatic detection of a decrease in mechanical strength (stiffness) due to, for example, a crack formed in the support or damage to a coupling element (for example, a bolt or a weld) is desired. Such a decrease in mechanical strength can be generally detected by detecting a change (decrease) in the natural frequency. The stiffness of the support, however, exhibits anisotropy due to, for example, variations in the strength of the coupling element in the circumferential direction of the support, or the shape of the base of the support. The natural frequency changes depending on this anisotropy of stillness of the support. This may prevent an accurate detection of a change in the natural frequency due to a decrease in mechanical strength.

Accordingly, an object of this invention is to provide a condition monitoring apparatus for a wind turbine capable of detecting whether or not an abnormality is present in the wind turbine by accurately detecting a change in the natural frequency of the wind turbine due to a decrease in mechanical strength.

Solution to Problem

A condition monitoring apparatus for a wind turbine according to this invention, wherein the wind turbine has a nacelle rotatably supported on a support, includes a vibration detection unit, a frequency analysis unit, a natural frequency detection unit, and an abnormality detection unit. The vibration detection unit is configured to detect a vibration generated in the wind turbine. The frequency analysis unit is configured to perform a frequency analysis of the vibration detected by the vibration detection unit. The natural frequency detection unit is configured to detect a natural frequency of the wind turbine in accordance with a direction of the nacelle, based on a result of the frequency analysis. The abnormality detection unit is configured to detect whether or not an abnormality is present in the wind turbine, based on the natural frequency detected by the natural frequency detection unit.

Preferably, the direction of the nacelle is divided into a plurality of sections. The natural frequency detection unit is configured to detect the natural frequency for each of the plurality of sections, based on the result of the frequency analysis. The abnormality detection unit is configured to detect an abnormality of the wind turbine if a decrease ratio in the natural frequency from the beginning of installation of the wind turbine in any of the plurality of sections exceeds a prescribed value.

Preferably, the natural frequency detection unit is configured to detect at least six different natural frequencies for each of a plurality of sections of the direction of the nacelle.

Preferably, the natural frequency detection unit is configured to detect the natural frequency when a prescribed environmental condition lasts for a predetermined duration. As an example, the natural frequency detection unit detects the natural frequency when ambient temperature and humidity are stable over a period of several days, and when the weather is fine.

Preferably, the frequency analysis unit is configured to perform the frequency analysis by executing a Fourier transform on a waveform of the vibration detected by the vibration detection unit. A time length on a time base of the waveform on which the Fourier transform is to be executed is 300 seconds or greater.

Preferably, the vibration detection unit includes a plurality of vibration sensors.

More preferably, the natural frequency detection unit is configured to identify a vibration mode of the wind turbine, based on a result of comparison between a phase of a spectrum of a vibration detected by a first vibration sensor of the plurality of vibration sensors and a phase of a spectrum of a vibration detected by a second vibration sensor of the plurality of vibration sensors.

More preferably, the first vibration sensor is provided on a more forward side of the nacelle than a rotation shaft of the nacelle with respect to the support. The second vibration sensor is provided on a more rear side of the nacelle than the rotation shaft.

Preferably, the wind turbine includes a rotation vibration detection unit configured to detect a vibration of a rotary device rotating with rotation of blades receiving a wind force. The vibration detection unit is configured to detect a vibration with a frequency lower than a frequency detected by the rotation vibration detection unit.

Advantageous Effects of Invention

According to this invention, because the natural frequency of the wind turbine in accordance with the direction of the nacelle is detected, a change in the natural frequency due to a decrease in mechanical strength can be detected separately from a change in the natural frequency due to a change in the direction of the nacelle. According to this invention, therefore, a change in the natural frequency of the wind turbine due to a decrease in mechanical strength can be accurately detected to detect whether or not an abnormality is present in the wind turbine. Furthermore, regular visual checks or hammering checks can be abandoned, or the interval of these checks can be lengthened.

DESCRIPTION OF EMBODIMENTS

Figure 1:
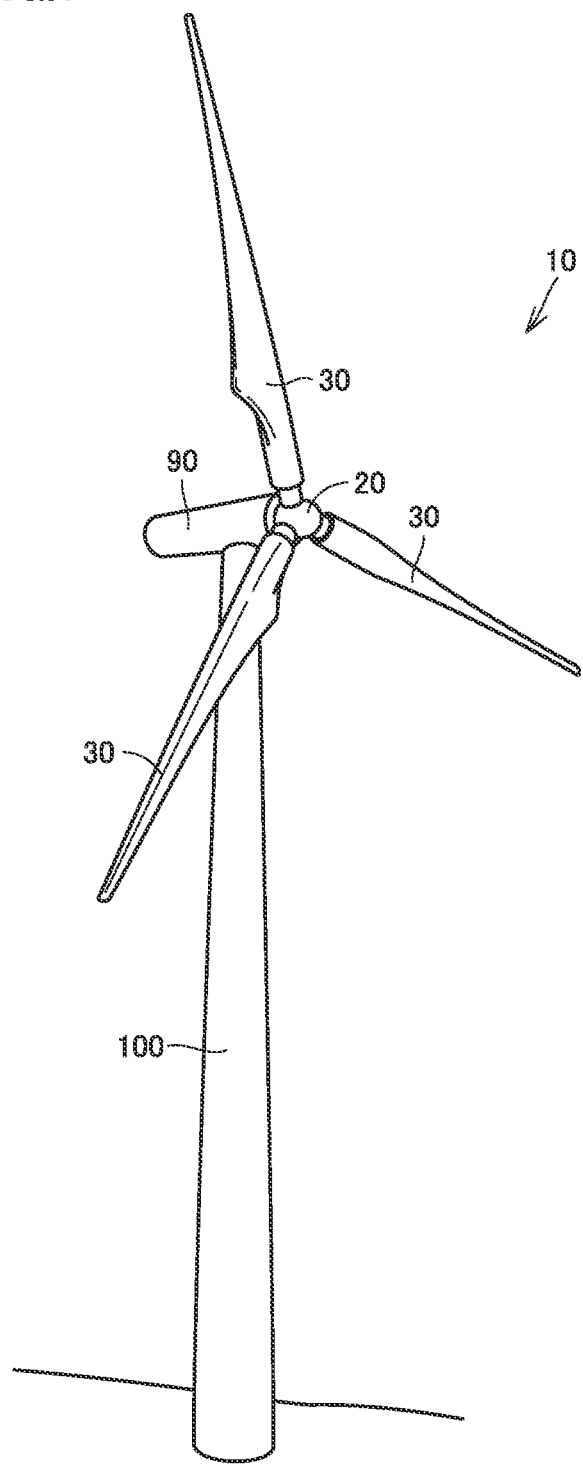
FIG. 1 is an external view of a wind turbine to which a condition monitoring apparatus according to a first embodiment of this invention is applied.

Embodiments of the present invention will be described below referring to the drawings. While a plurality of embodiments are described below, an appropriate combination of features described in each of the embodiments is contemplated as of the filing of the original application. In the following description, identical or corresponding elements are labeled with identical reference signs, and detailed description thereof will not be repeated.

First Embodiment

FIG. 1 is an external view of a wind turbine to which a condition monitoring apparatus according to the first embodiment of this invention is applied. Referring to FIG. 1, a wind turbine 10 includes a rotor head 20, blades 30, a nacelle 90, and a tower 100. Nacelle 90 is installed on the top of tower 100. Nacelle 90 is rotatably supported on the top of tower 100. A direction of nacelle 90 (yaw angle) is controlled in accordance with a wind direction.

Blades 10 are circumferentially attached to rotor head 20. Blades 30 are configured such that a pitch angle thereof (the angle of a wind-receiving face of blades 30) is changeable, wherein the pitch angle is appropriately controlled in accordance with a wind force, for example. Rotor head 20 is connected to a main shaft introduced into nacelle 90, and the main shaft is coupled to an input shaft of a gearbox, of which an output shaft is connected to a power generator (not illustrated).

Figure 2:
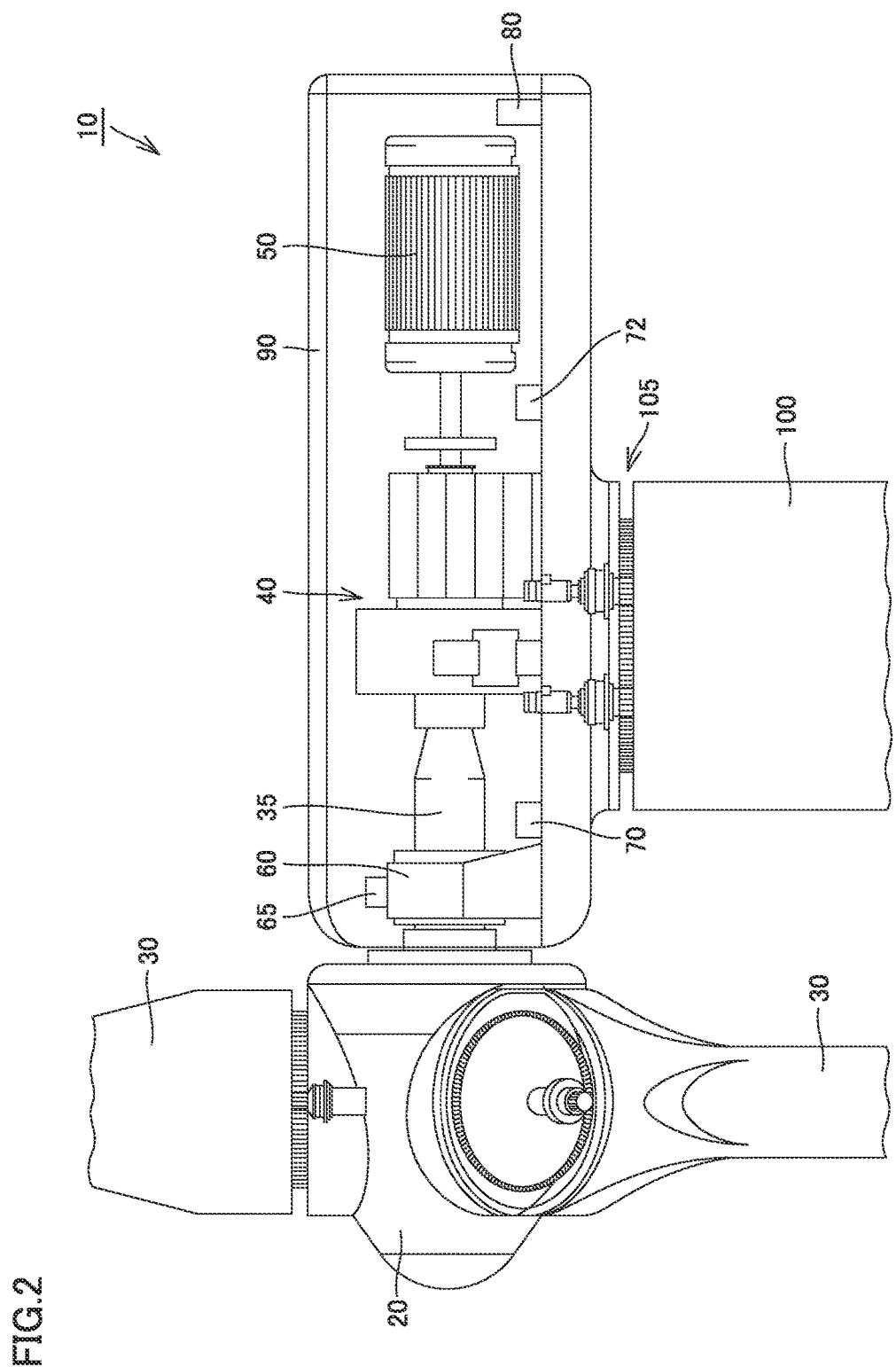
FIG. 2 is a diagram showing in detail the configuration of the wind turbine.

FIG. 2 is a diagram showing in detail the configuration of wind turbine 10. Referring to FIG. 2, a main shaft 35, a gearbox 40, a power generator 50, a main shaft bearing 60, vibration sensors 65, 70, and 72, and a condition monitoring apparatus 80 are provided within nacelle 90. Nacelle 90 is rotatably supported by a yaw driving device 105 on tower 100.

Main shaft 35 is connected to rotor head 20, and enters nacelle 90 from rotor head 20 to be connected to the input shaft of gearbox 40. Main shaft 35 transmits a rotational force generated by blades 30 receiving the wind force, to the input shaft of gearbox 40. Blades 30 are provided on rotor head 20, and convert the wind force into a rotational force for transmission to main shaft 35.

Gearbox 40 is provided between main shaft 35 and power generator 50, and increases the rotational speed of main shaft 35 and outputs the increased rotational speed to power generator 50. Gearbox 40 is formed of a speed-increasing gear mechanism including a planetary gear, an intermediate shaft, a high speed shaft, and the like. Power generator 50 is connected to the output shaft of gearbox 40, and generates power with the rotational force received from gearbox 40. Power generator 50 is formed of an induction generator, for example.

Main shaft bearing 60 rotatably supports main shaft 35. Main shaft bearing 60 is formed of a rolling bearing, for example, a self-aligning roller bearing, a conical roller bearing, a cylindrical roller bearing, or a ball bearing. Main shaft bearing 60 may be a single-row or multi-row bearing. Vibration sensor 65 detects vibrations of main shaft bearing 60. Note that vibration sensor 65 corresponds to one embodiment of the "rotation vibration detection unit" according to this invention.

Vibration sensors 70, 72 detect vibrations generated in wind turbine 10. While the number of vibration sensors for detecting vibrations generated in wind turbine 10 may be one, or three or more, it is preferably more than one. This is because even if one sensor is present at a vibration node, vibrations may be detected with another sensor, or even if individual sensors have a small output, it can be determined that natural vibrations are being generated, based on the output of a plurality of sensors.

Each of vibration sensors 70, 72 is capable of detecting at least vibrations in a biaxial direction perpendicular to a horizontal direction, and is formed of an acceleration sensor using a piezoelectric device, for example. Each of vibration sensors 70, 72 is configured to be capable of detecting vibrations with a frequency lower than that detected by vibration sensor 65 that detects vibrations of main shaft bearing 60. As each of vibration sensors 70, 72, a known low-frequency acceleration sensor capable of measuring a frequency as low as 0.05 Hz (within ±3 dB) can be adopted, for example.

In the first embodiment, vibration sensors 70, 72 are provided within nacelle 90, the example, on a frame inside nacelle 90. Vibration sensor 70 is provided on a more forward side (rotor head 20-side) of nacelle 90 than a rotation shaft of nacelle 90 with respect to tower 100. On the other hand, vibration sensor 72 is provided on a more rear side (power generator 50-side) of nacelle 90 than the rotation shaft of nacelle 90 with respect to tower 100. While the arrangement of vibration sensors 70, 72 is not limited to that as described herein, a vibration mode of wind turbine 10 can be accurately identified (as will be described below) when vibration sensors 70, 72 are arranged on opposite sides with the rotation shaft of nacelle 90 interposed therebetween, as illustrated.

Condition monitoring apparatus 80 receives detection values from vibration sensors 70, 72. Condition monitoring apparatus 80 executes condition monitoring processing for wind turbine 10 in accordance with a program or the like prepared in advance. As one example of condition monitoring executed by condition monitoring apparatus 80, condition monitoring apparatus 80 detects a natural frequency of wind turbine 10, and monitors a change (decrease) in the natural frequency from the beginning of equipment installation, thereby detecting whether or not there is a decrease in mechanical strength (stiffness) due to, for example, a crack formed in tower 100 as a result of metal fatigue or the like, or damage to the coupling element for example, a bolt or a weld). For the detection of the natural frequency of wind turbine 10, condition monitoring apparatus 80 performs a frequency analysis of a vibration waveform detected by each of vibration sensors 70, 72, and detects the natural frequency based on the result of the frequency analysis.

Figure 3:
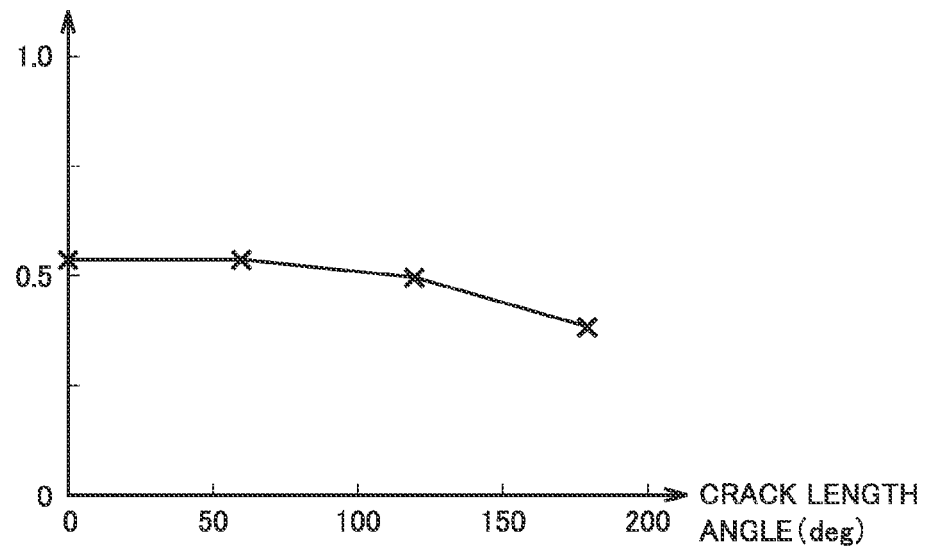
FIG. 3 is a diagram showing one exemplary relationship between the natural frequency and the crack length when a crack is formed in a tower.
Figure 4:
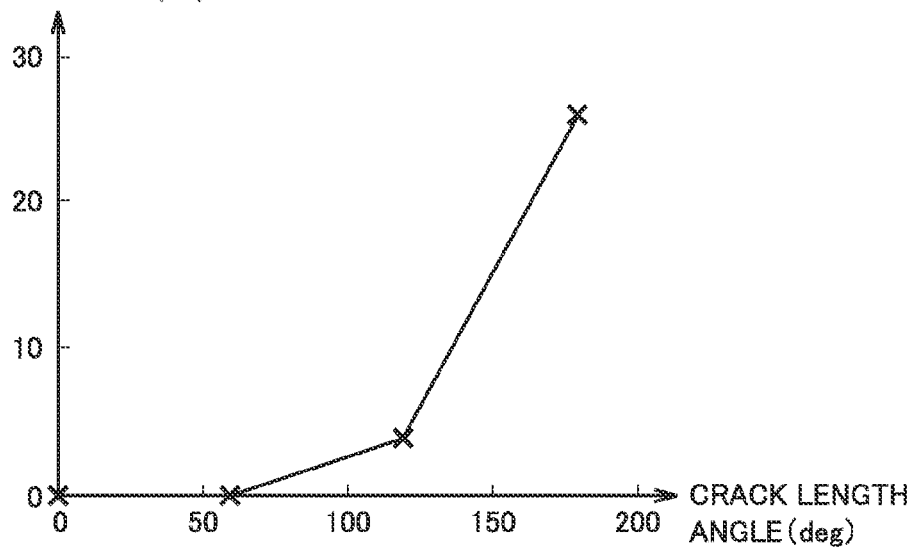
FIG. 4 is a diagram showing one exemplary relationship between the crack length and the decrease ratio in the natural frequency.

With FIGS. 3 and 4, results of simulations analyzing a change (decrease) in the natural frequency when a crack is formed in tower 100 will be described. FIG. 3 is a diagram showing one exemplary relationship between the natural frequency and the crack length when a crack is formed in the tower. FIG. 4 is a diagram showing one exemplary relationship between the crack length and the decrease ratio in the natural frequency. In each of FIGS. 3 and 4, the natural frequency of torsional vibration of tower 100 is shown as one example.

In the simulations, a finite element model of wind turbine 10 was created. The simulations were performed for the case where tower 100 was free of cracks, and for the case where tower 100 was provided with a predetermined amount of cracking in the simulations, tower 100 was formed of a thin cylinder made of steel having a diameter of 2 m and a plate thickness of 8 mm, and having a height of 50 m. A portion near an upper end of tower 100 was circumferentially provided with a crack reaching the thickness of the steel plate.

Referring to FIGS. 3 and 4, the crack length angle (deg) represents the length of the crack circumferentially provided in tower 100, a crack length angle of 0° represents the case where there is no crack, and a crack length angle of 180° represents the case where a crack was provided halfway around the tower in the circumferential direction.

At a crack length angle of 60° (⅙ the entire circumference of the tower), no decrease in the natural frequency is observed. At a crack length angle of 120° (⅓ the entire circumference of the tower), however, a decrease in the natural frequency is observed. At a crack length angle of 180° (½ the entire circumference of the tower), the natural frequency significantly decreases. Thus, cracking of tower 100 causes a decrease in the stiffness of tower 100, which emerges as a decrease in the natural frequency. Hence, the natural frequency of wind turbine 10 is detected using the detection values from vibration sensors 70, 72, and a change (decrease) in the natural frequency from the beginning of equipment installation is monitored, thereby detecting an abnormality such as a crack formed in tower 100 or damage to the coupling element (for example, a bolt or a weld).

Note that the natural frequency of wind turbine 10 changes depending on the direction (yaw angle) of nacelle 90. This is because the stiffness of a structure under tower 100 exhibits variations in the circumferential direction of tower 100. Specifically, a tower is generally constructed by joining several cylindrical members to one another with ring-shaped steel members with flanges. Thus, because of machining errors in flange surfaces or variations in the bolt clamping force, for example, the bending stiffness of the tower as a whole exhibits variations depending on the direction (horizontal direction). Moreover, the shape of a concrete base or the like, which is provided on the ground, is not necessarily uniform in the circumferential direction of the tower. The stiffness of the ground itself on which the base is installed may also exhibit some variations depending on the direction.

Figure 5:
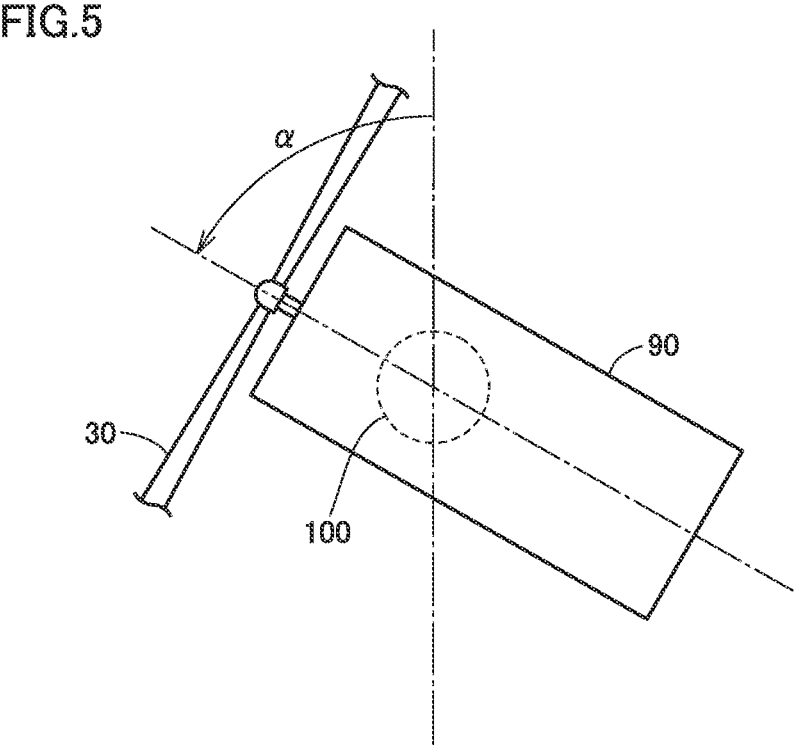
FIG. 5 is a diagram of the wind turbine seen from above.

As described above, the stiffness of the structure under the tower, including the tower, exhibits variations in the circumferential direction of the tower, which are referred to as the "anisotropy of stiffness of the tower" hereinafter. Nacelle 90 has the shape of a rectangle or a long cylinder, as shown in FIGS. 1 and 2. Thus, when the direction of nacelle 90 changes, the distribution of the force applied to the structure under the tower changes, which causes the natural frequency to change depending on the anisotropy of stiffness of the tower. In the first embodiment, therefore, as shown in FIG. 5, the natural frequency of wind turbine 10 is monitored in accordance with a direction α of nacelle 90 from a given reference direction. This eliminates an effect of the anisotropy of stiffness of the tower upon a change in the natural frequency in accordance with direction α of nacelle 90. As a result, a change (decrease) in the natural frequency can be accurately detected based on a decrease in stiffness due to a crack formed in tower 100, for example.

Figure 6:
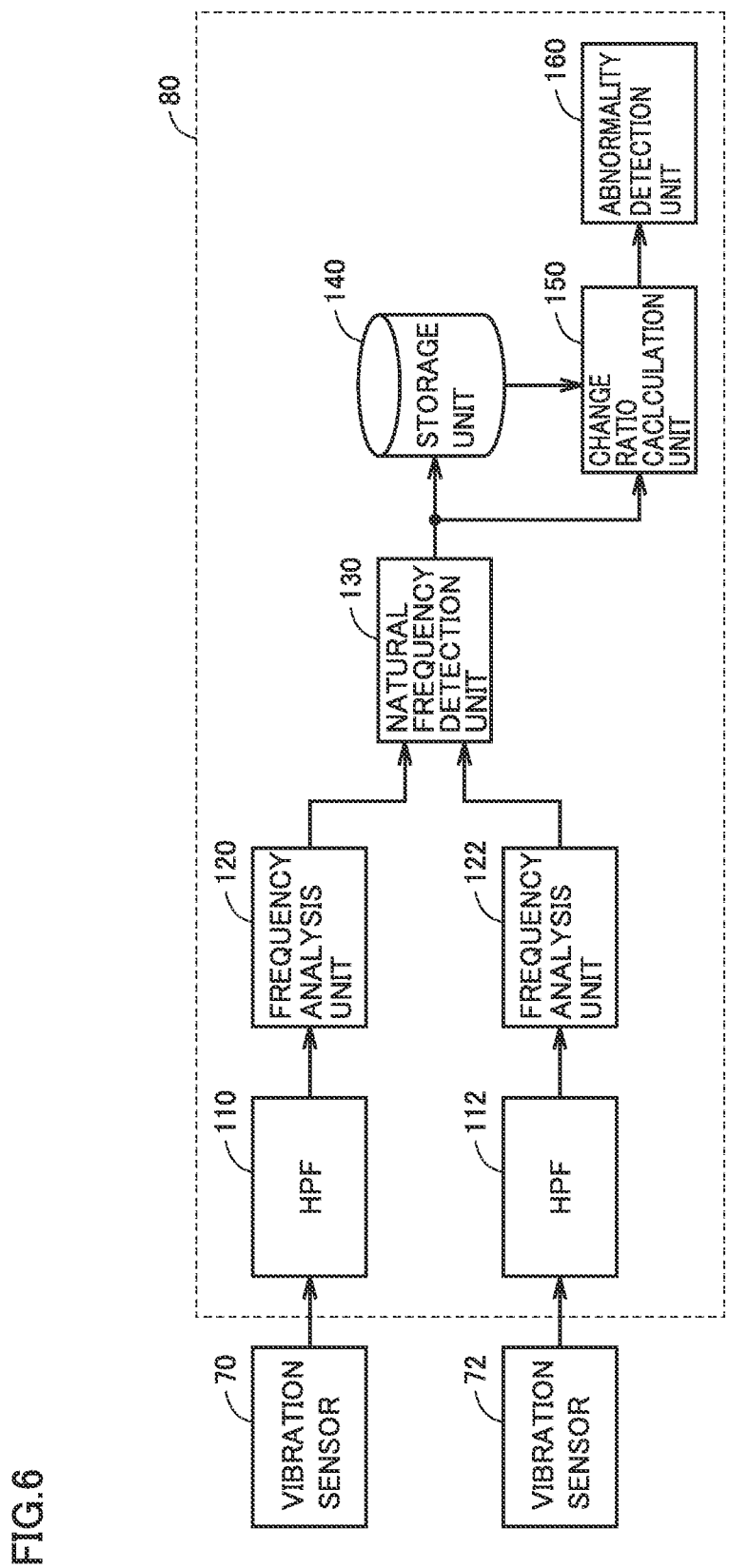
FIG. 6 is a functional block diagram of the condition monitoring apparatus shown in FIG. 2.

FIG. 6 is a functional block diagram of condition monitoring apparatus 80 shown in FIG. 2. Referring to FIG. 6, condition monitoring apparatus 80 includes high-pass filters (HPF) 110, 112, frequency analysis units 120, 122, a natural frequency detection unit 130, a storage unit 140, a change ratio calculation unit 150, and an abnormality detection unit 160.

HPF 110 passes a signal component with a frequency higher than a predetermined frequency and cuts off a low-frequency component, for a detection signal received from vibration sensor 70. HPF 110 is provided to remove a direct-current component included in the detection signal from vibration sensor 70. HPF 110 may not be provided if the detection signal from vibration sensor 70 includes no direct-current component.

Figures 7, 8, 9:
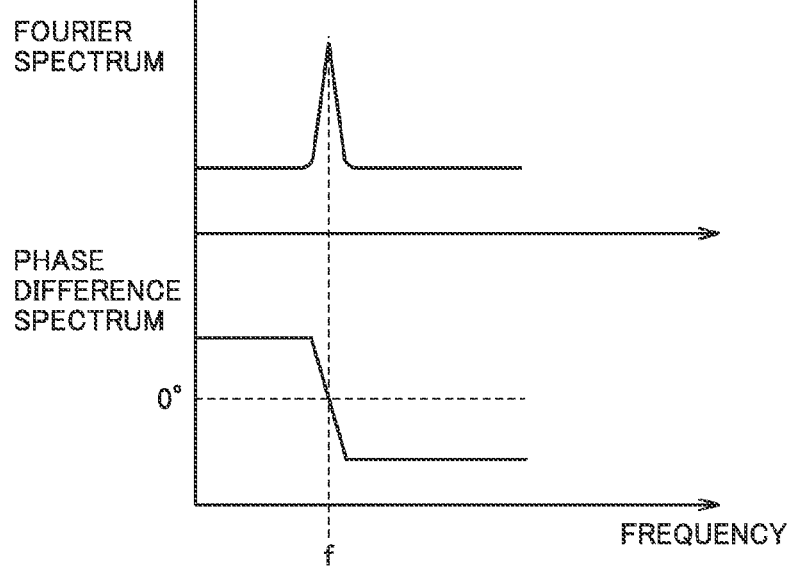
FIG. 7 is a diagram for use in explaining processing performed by a frequency analysis unit.
FIG. 8 is a diagram showing natural frequencies monitored by the condition monitoring apparatus.
FIG. 9 is a diagram for use in explaining natural frequencies divided in accordance with the rating of a power generator.

Frequency analysis unit 120 performs a frequency analysis of a vibration waveform from which the direct-current component has been removed by HPF 110, and outputs the analytical result to natural frequency detection unit 130. Specifically, frequency analysis unit 120 performs fast Fourier transform (FFT) processing on the vibration waveform received from HPF 110, and outputs calculation results of a Fourier spectrum and a phase difference spectrum as shown in FIG. 7 to natural frequency detection unit 130.

As shown in FIG. 3, because the natural frequency of wind turbine 10 can decrease to as low as about 0.3 Hz, a frequency resolution of about 0.003 Hz is required to monitor, for example, a 1% change in this natural frequency. In the first embodiment, therefore, a time length T on a time base of the vibration waveform on which the Fourier transform is to be executed by frequency analysis unit 120 is set to 300 seconds or greater. The frequency resolution is denoted as 1/T, and thus, a time length T of 300 seconds or greater on a time base is required to achieve a frequency resolution of about 0.003 Hz.

Note that spectra obtained by Fourier transforms may be measured a plurality of times, and the results may be averaged (not particularly illustrated). This allows a random noise component to be reduced.

HPF 112 receives a detection signal from vibration sensor 72. Frequency analysis unit 122 receives a vibration waveform from which a direct-current component has been removed by HPF 112. HPF 112 and frequency analysis unit 122 are the same in configuration as HPF 110 and frequency analysis unit 120, respectively, and thus, description thereof will not be repeated.

Natural frequency detection unit 130 detects the natural frequency of wind turbine 10, based on the result of the frequency analysis from each of frequency analysis units 120, 122. More specifically, as shown in FIG. 7, natural frequency f is shown as a peak value in the Fourier spectrum, and natural frequency f is shown at a zero-crossing point where the phase of the spectrum is inverted in the phase difference spectrum. Natural frequency detection unit 130 therefore detects natural frequency f, either by detecting the peak value in the Fourier spectrum received from frequency analysis unit 120 and/or 122, or by detecting the zero-crossing point in the phase difference spectrum received from frequency analysis unit 120 and/or 122.

As described above, the natural frequency of wind turbine 10 changes depending on direction α FIG. 5) of nacelle 90. In the first embodiment, therefore, the natural frequency is monitored in accordance with the direction of nacelle 90.

FIG. 8 is a diagram showing natural frequencies monitored by condition monitoring apparatus 80. Referring to FIG. 8, the direction of nacelle 90 is divided into sections for every 30°. Natural frequency detection unit 130 then detects a natural frequency in the manner described above, and simultaneously obtains a direction of nacelle 90 at the time of the detection, to detect the natural frequency in a section corresponding to the direction of nacelle 90. The direction of nacelle 90 can be detected based on an angle sensor provided in yaw driving device 105 (FIG. 2) or an angle command value provided to yaw driving device 105. Note that the sections are not limited to those described herein. The number of sections may be reduced by increasing the range of each section, or may be increased by reducing the range of each section.

Note that while yaw driving device 105 causing the direction of nacelle 90 to rotate is in operation, the contact stiffness of a driving gear increases, which causes the stiffness of nacelle 90 and tower 100 in a torsional direction to also increase. Thus, a decrease in the natural frequency may also be detected by inputting or measuring power consumption, rotation speeds, or the like of yaw driving device 105, subdividing the sections into further sections corresponding thereto, and storing and comparing natural frequencies. For example, for cases where the power consumption of yaw driving device 105 is 10% or less, 10 to 60%, and 60% or more, of the rating, further sections may be provided for each direction of nacelle 90.

Moreover, in the first embodiment, six natural frequencies are detected in each section. For example, the six natural frequencies, f1 (1) to f1 (6), are detected in a section where the direction of nacelle 90 is 0 to 30°. A reason for this is as follows. Bending and torsion of the tower need to be examined as vibration modes. In this case, there are two natural values for bending, because of the presence of multiple roots, and there is one natural value for torsion. Furthermore, because high order modes are present in the vibration mode of each of bending and torsion, at least up to second-order vibration modes are examined, so that a total of six natural frequencies are detected in the first embodiment. Note that more natural frequencies may be detected to examine higher order modes.

Note that the detection of at least six natural frequencies in each section is not an essential feature of this invention. For example, the simulation results show that for the crack formed in the circumferential direction of the tower, the natural frequency of torsional vibration of the tower changes relatively significantly, and therefore, only natural frequencies of torsional vibration may be detected in each section.

Referring back to FIG. 6, natural frequency detection unit 130 records in storage unit 140 natural frequencies for each section of the direction of nacelle 90 detected at the beginning of equipment installation. Although each of the natural frequencies shown in FIG. 8 is not necessarily detected immediately after the equipment installation, all of the natural frequencies are detected and recorded as the running time of wind turbine 10 accumulates. Alternatively, in order to detect natural frequencies in each section, nacelle 90 may be forced to rotate such that the direction of nacelle 90 is brought into each of the sections. Condition monitoring based on a decrease in the natural frequency is then performed with reference to each of the natural frequencies at the beginning of equipment installation recorded in memory unit 140.

Change ratio calculation unit 150 receives information on a natural frequency detected by natural frequency detection unit 130 and the direction of nacelle 90 at the time of the detection. Change ratio calculation unit 150 then reads from storage unit 140 a reference value (value at the beginning of equipment installation) of the natural frequency in accordance with the direction of nacelle 90, and compares the reference value with the natural frequency received from natural frequency detection unit 130, thereby calculating a decrease ratio in the natural frequency. Note that the six natural frequencies are monitored for each section as described above, and the decrease ratio is calculated for each of the natural frequencies detected.

Abnormity detection unit 160 detects an abnormality in wind turbine 10, based on the calculation result of change ratio calculation unit 150. Specifically, abnormality detection unit 160 has a preset threshold value of the decrease ratio in the natural frequency for determining an abnormality of the six natural frequencies. If the decrease ratio calculated by change ratio calculation unit 150 exceeds the threshold value, an abnormality is determined to be present in wind turbine 10. Note that an abnormality is determined to be present in wind turbine 10 even if the decrease ratio in only one of the six natural frequencies exceeds the threshold value in any of the sections of the direction of nacelle 90.

While the natural frequencies at the beginning of equipment installation are recorded in storage unit 140 in the foregoing description, natural frequencies detected by natural frequency detection unit 130 may be continuously recorded for each section of the direction of nacelle 90, and change ratio calculation unit 150 may calculate a change ratio based on the data recorded in memory unit 140.

Furthermore, the result of the detection by abnormality detection unit 160 as to whether or not an abnormality is present is transmitted to an external condition monitoring server or the like over a wireless or wired communication means, and if an abnormality is detected, an alarm is displayed on wind turbine 10, the condition monitoring server, or the like (not particularly illustrated).

Note that for accurate detection of the natural frequency, the external force for exciting the natural frequency is desirably greater. Thus, for example, lower limits may be set for the wind velocity, the amount of power generation by power generator 50, the rotation speed of main shaft 35, and the like, as conditions under which natural frequency detection unit 130 detects the natural frequency. Alternatively, natural frequency detection unit 130 may be configured to detect the natural frequency exclusively in a section corresponding to a direction (range) in which the wind blows the strongest, of all the above-described sections of the direction of nacelle 90.

Furthermore, the natural frequency is preferably detected in situations in which the amount of moisture included in the blades, or the amounts of water, ice, snow, and the like attached to or deposited on the inside or outside of the blades, do not change (not particularly illustrated). To achieve a weight reduction, the blades are formed of a CFRP (Carbon Fiber Reinforced Plastic) or a GFRP (Glass Fiber Reinforced Plastic), for example, or are provided with a hollow therein. The detected natural frequency is therefore affected by a change in the amount of water absorption of the above-described material having water absorbency or the amount of moisture entered into the hollow inside the blades, or by a mass change caused by a change in the amounts of water, ice, snow, and the like attached to or deposited on the inside or outside of the blades.

Thus, ambient temperature and humidity may be measured, and based on these information, the detection of the natural frequency and the abnormality determination may be performed only when, for example, a time during which the ambient temperature is 10° or higher and the humidity is 70% or lower lasts for a duration of 72 hours or longer. Note that the temperature, humidity, and duration described above are only by way of example, and conditions under which the abnormality determination performed can be determined depending on the place where the wind turbine is installed. Moreover, in conjunction with the information on temperature and humidity, information on weather may also be used. For example, the detection of the natural frequency and the abnormality determination may be performed when the weather is fine.

As described above, in the first embodiment, because the natural frequency of wind turbine 10 in accordance with the direction of nacelle 90 is detected, a change in the natural frequency due to a decrease in the stiffness of tower 100 can be detected separately from a change in the natural frequency due to a change in the direction of nacelle 90. According to the first embodiment, therefore, a change in the natural frequency of wind turbine 10 due to a decrease in the stiffness of tower 100 can be accurately detected to detect whether or not an abnormality is present in wind turbine 10. Furthermore, regular visual checks or hammering checks can be abandoned, or the interval of these checks can be lengthened.

Moreover, in the first embodiment, because the six different natural frequencies are detected and monitored for each section of the direction of nacelle 90, a change in the natural frequency in accordance with the vibration mode occurring in wind turbine 10 can be accurately detected to detect whether or not an abnormality is present in the wind turbine.

Furthermore, in the first embodiment, the time length on a time base of the vibration waveform on which the Fourier transform is to be executed by frequency analysis units 120, 122 is set to 300 seconds or greater. Thus, even for a natural frequency with a low frequency of about 0.3 Hz, a change in the natural frequency can be accurately detected to detect whether or not an abnormality is present in wind turbine 10.

Second Embodiment

Forces that may serve as exciting forces for wind turbine 10 mainly include a wind force, a centrifugal force resulting from the rotation of blades 30, and a force resulting from a meshing transmission error of the gear of gearbox 40. In the second embodiment, attention is focused on an exciting force resulting from the meshing transmission error of the gear of gearbox 40, and the natural frequency is subdivided in accordance with the amount of power generation by power generator 50. In this way, for example, in the case where a peak of the natural frequency in a Fourier spectrum when the amount of power generation is intermediate (for example, about 50% or more of the rating) is more prominent than a peak of the natural frequency in a Fourier spectrum when the amount of power generation is large (for example, 80% or more of the rating), the abnormality determination can be performed more accurately using the natural frequency detected when the amount of power generation is intermediate.

The wind turbine according to the second embodiment is the same in configuration as wind turbine 10 according to the first embodiment.

FIG. 9 is a diagram for use in explaining natural frequencies divided in accordance with the rating of power generator 50. Referring to FIG. 9 with FIG. 8, the rating of power generator 50 is further classified into, for example, three sections, i.e., 0 to 40%, 40 to 80%, and 80% or more, with respect to natural frequency f1 (1) when the direction of nacelle 90 is 0 to 30°. Similarly, with respect to each of the other natural frequencies shown in FIG. 8 divided in accordance with the direction of nacelle 90, the natural frequency is subdivided in accordance with the rating of power generator 50, as with natural frequency f1 (1) (not illustrated).

According to the second embodiment, the natural frequency in a vibration mode that is significantly affected by the exciting force resulting from the meshing transmission error of the gear of gearbox 40 is accurately detected to detect whether or not an abnormality is present in wind turbine 10.

While the natural frequency is subdivided in accordance with the amount of power generation by power generator 50 in the foregoing description, the natural frequency may be divided in accordance with other items such as the wind velocity and the wind direction (in particular, the wind direction, relative to the direction of nacelle 90).

Third Embodiment

As shown in FIG. 2, vibration sensor 70 is provided on a more forward side (rotor head 20-side) of nacelle 90 than the rotation shaft of nacelle 90 with respect to tower 100, and vibration sensor 72 is provided on a more rear side (power generator 50-side) of nacelle 90 than the rotation shaft of nacelle 90 with respect to tower 100. That is, vibration sensors 70, 72 are arranged on opposite sides with the rotation shaft of nacelle 90 interposed therebetween. In the third embodiment, the vibration mode (bending/torsion) of wind turbine 10 is accurately identified using this arrangement of vibration sensors 70, 72.

Specifically, it is determined that the torsional vibration mode is occurring when a spectrum of vibrations based on signals from vibration sensor 70 and a spectrum of vibrations based on signals from vibration sensor 72 are inverted in phase. It is also determined that the bending vibration mode is occurring when the spectrum of vibrations based on signals from vibration sensor 70 and the spectrum of vibrations based on signals from vibration sensor 72 are identical in phase.

The wind turbine according to the third embodiment is the same in configuration as wind turbine 10 according to the first embodiment shown in FIGS. 1 and 2.

Figure 10:
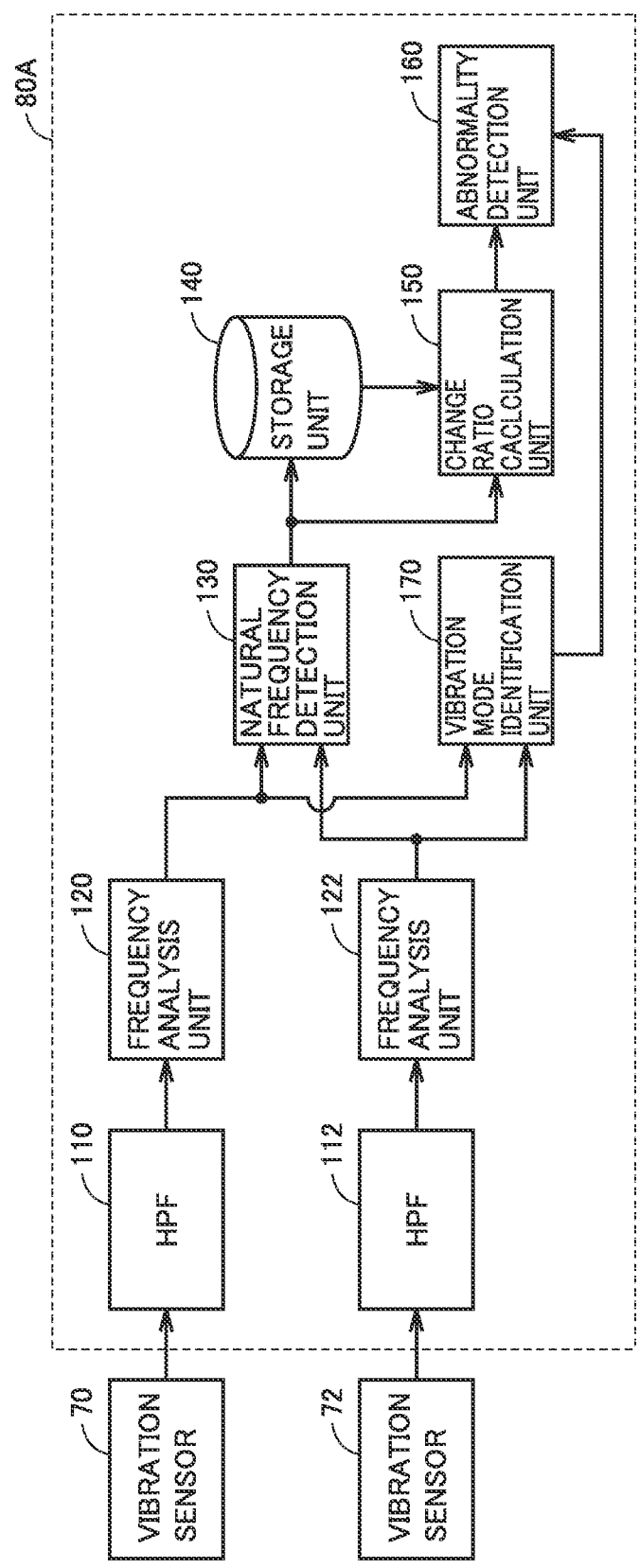
FIG. 10 is a functional block diagram of a condition monitoring apparatus according to a third embodiment.

FIG. 10 is a functional block diagram of condition monitoring apparatus 80A according to the third embodiment. Referring to FIG. 10, condition monitoring apparatus 80A further includes a vibration mode identification unit 170 in the configuration of condition monitoring apparatus 80 shown in FIG. 6.

Vibration mode identification unit 170 identifies the occurring vibration mode based on the results of the frequency analysis from frequency analysis units 120, 122. More specifically, vibration mode identification unit 170 compares a phase of a spectrum received from frequency analysis unit 120 and a phase of a spectrum received from frequency analysis unit 122. If the phases are inverted from each other, vibration mode identification unit 170 determines that the torsional vibration mode is occurring, and if the spectra are substantially identical to each other, vibration mode identification unit 170 determines that the bending vibration mode is occurring. Vibration mode identification unit 170 then notifies the identification result to abnormality detection unit 160.

In this way, when an abnormality in wind turbine 10 is detected based on the calculation result of change ratio calculation unit 150, a detection as to which vibration mode is occurring can also be made based on the result of identification of the vibration mode by vibration mode identification unit 170.

As described above, according to the third embodiment, a change in the natural frequency of wind turbine 10 can be accurately detected to detect whether or not an abnormality is present in wind turbine 10, and the vibration mode of wind turbine 10 at the time of an abnormality can be accurately identified.

While an abnormality in wind turbine 10 is detected by condition monitoring apparatuses 80, 80A provided within nacelle 90 in each of the foregoing embodiments, a detection as to whether or not an abnormality is present may also be made by transmitting the analytical results from frequency analysis units 120, 122 (FIGS. 6 and 10) to an external condition monitoring server (not illustrated), and detecting natural frequencies with the condition monitoring server.

Practice of an appropriate combination of the embodiments disclosed herein is also contemplated. It should also be understood that the embodiments disclosed herein are illustrative and non-restrictive in every respect. It is intended that the scope of the present invention is defined by the terms of the claims rather than by the description of the foregoing embodiments and examples, and includes all modifications within the scope and meaning equivalent to the claims.

REFERENCE SIGNS LIST

10: wind turbine; 20: rotor head; 30: blade; 35: main shaft; 40: gearbox; 50: power generator; 60: main shaft bearing; 65, 70, 72: vibration sensor; 80, 80A: condition monitoring apparatus; 90: nacelle; 100: tower; 105: yaw driving device; 110, 120: HPF; 120, 122: frequency analysis unit; 130: natural frequency detection unit; 140: storage unit; 150: change ratio detection unit; 160: abnormality detection unit; and 170: vibration mode identification unit.

The invention claimed is:

1. A condition monitoring apparatus for a wind turbine, the wind turbine having a nacelle rotatably supported on a support, the condition monitoring apparatus comprising:
   a vibration detection unit configured to detect a vibration generated in the wind turbine;
   a frequency analysis unit configured to perform a frequency analysis of the vibration detected by the vibration detection unit;
   a natural frequency detection unit configured to detect a natural frequency of the wind turbine in accordance with a direction of the nacelle, based on a result of the frequency analysis; and
   an abnormality detection unit configured to detect whether or not an abnormality is present in the wind turbine, based on the natural frequency detected by the natural frequency detection unit.

2. The condition monitoring apparatus for the wind turbine according to claim 1,
   wherein
   the direction of the nacelle is divided into a plurality of sections,
   the natural frequency detection unit is configured to detect the natural frequency for each of the plurality of sections, based on the result of the frequency analysis, and
   the abnormality detection unit is configured to detect an abnormality of the wind turbine if a decrease ratio in the natural frequency from the beginning of installation of the wind turbine in any of the plurality of sections exceeds a prescribed value.

3. The condition monitoring apparatus for the wind turbine according to claim 1, wherein
   the natural frequency detection unit is configured to detect at least six different natural frequencies for each of a plurality of sections of the direction of the nacelle.

4. The condition monitoring apparatus for the wind turbine according to claim 1, wherein
   the natural frequency detection unit is configured to detect the natural frequency when a prescribed environmental condition lasts for a predetermined duration.

5. The condition monitoring apparatus for the wind turbine according to claim 1, wherein
   the frequency analysis unit is configured to perform the frequency analysis by executing a Fourier transform on a waveform of the vibration detected by the vibration detection unit, and
   a time length on a time base of the waveform on which the Fourier transform is to be executed is 300 seconds or greater.

6. The condition monitoring apparatus for the wind turbine according to claim 1, wherein
   the vibration detection unit includes a plurality of vibration sensors.

7. The condition monitoring apparatus for the wind turbine according to claim 6, wherein
   the natural frequency detection unit is configured to identify a vibration mode of the wind turbine, based on a result of comparison between a phase of a spectrum of a vibration detected by a first vibration sensor of the plurality of vibration sensors and a phase of a spectrum of a vibration detected by a second vibration sensor of the plurality of vibration sensors.

8. The condition monitoring apparatus for the wind turbine according to claim 7, wherein
   the first vibration sensor is provided on a more forward side of the nacelle than a rotation shaft of the nacelle with respect to the support, and
   the second vibration sensor is provided on a more rear side of the nacelle than the rotation shaft.

9. The condition monitoring apparatus for the wind turbine according to claim 1, wherein
   the wind turbine includes a rotation vibration detection unit configured to detect a vibration of a rotary device rotating with rotation of blades receiving a wind force, and
   the vibration detection unit is configured to detect a vibration with a frequency lower than a frequency detected by the rotation vibration detection unit.

* * * * *